(12) United States Patent
Sampigethaya (10) Patent No.: US 10,303,941 B2
(45) Date of Patent: *May 28, 2019

(54) LOCATING LIGHT SOURCES USING AIRCRAFT

(71) Applicant: The Boeing Company, Chicago, IL (US)

(72) Inventor: Radhakrishna G. Sampigethaya, Snoqualmie, WA (US)

(73) Assignee: The Boeing Company, Chicago, IL (US)

( * ) Notice: Subject to any disclaimer, the term of this patent is extended or adjusted under 35 U.S.C. 154(b) by 795 days.

This patent is subject to a terminal disclaimer.

(21) Appl. No.: 14/447,020

(22) Filed: Jul. 30, 2014

(65) Prior Publication Data
US 2016/0364866 A1 Dec. 15, 2016

(51) Int. Cl.
*G06K 9/00* (2006.01)
*G01S 5/00* (2006.01)
(Continued)

(52) U.S. Cl.
CPC ............ *G06K 9/0063* (2013.01); *G01S 3/78* (2013.01); *G01S 5/0009* (2013.01);
(Continued)

(58) Field of Classification Search
CPC ..... G06T 7/70; G06T 7/97; G01S 3/78; G01S 3/7803; G01S 5/00; G01S 5/0009; G01S 5/0018; G01S 5/0027; G01S 5/0036; G01S 5/0072; G01S 5/16; G01S 7/4804; G01S 7/4808; G01S 17/02; G01S 17/026;
(Continued)

(56) References Cited

U.S. PATENT DOCUMENTS 4,446,363 A * 5/1984 Lakin .................... G01S 3/7803
353/11
4,962,311 A * 10/1990 Poisel ..................... G01S 3/784
356/141.5
(Continued)

OTHER PUBLICATIONS

J. Dubois and F. Reid, "Detecting laser sources on the battlefield", Proceedings of SPIE, vol. 6796, 2007, pp. 1-16.*
(Continued)

*Primary Examiner* — Eric Rush
(74) *Attorney, Agent, or Firm* — Kwan & Olynick LLP (57) ABSTRACT

Provided are methods and systems for identifying location of light sources from airborne aircraft. Light sources are ground based and may be low power lasers and other like devices. An aircraft equipped with a detecting module, such as a camera of a ground maneuver camera system, may defect light source output and associate this output with the relative position of the aircraft to the light source. This information may be analyzed together with aircraft location information (at the time of light source detection) to generate a light source location estimate. In some embodiments, other information, such as transmission from other aircraft and/or ground based nodes can be used. The estimate may be transmitted to a ground based node, such as a law enforcement unit. The data from multiple aircraft and/or ground based nodes may be aggregated to more precisely identify the light source location.

20 Claims, 6 Drawing Sheets

(51) Int. Cl.
*G01S 17/06* (2006.01)
*G01S 3/78* (2006.01)
*G06T 7/70* (2017.01)
*G01S 5/16* (2006.01)
*G06T 7/73* (2017.01)
*H04B 7/185* (2006.01)

(52) U.S. Cl.
CPC .......... *G01S 5/0018* (2013.01); *G01S 5/0027* (2013.01); *G01S 5/16* (2013.01); *G01S 17/06* (2013.01); *G06T 7/70* (2017.01); *G06T 7/73* (2017.01); *G06T 2207/10032* (2013.01); *H04B 7/18506* (2013.01); *H04B 7/18523* (2013.01); *Y02D 70/164* (2018.01); *Y02D 70/446* (2018.01)

(58) Field of Classification Search
CPC .......... G01S 17/06; G01S 17/42; G01S 17/46; G01S 17/66; G01S 17/87; G01S 17/875; G01S 2205/002; G01S 2205/003; G01S 2205/005; G01C 3/10; G01C 3/12; G01C 11/30; G01C 11/32; G01C 11/34
USPC ....... 382/100, 103; 356/3.13, 4.01, 614, 623
See application file for complete search history.

(56) References Cited

U.S. PATENT DOCUMENTS

| | | | | |
|---|---|---|---|---|
| 5,042,942 A * | 8/1991 | Brimberg | ............... | G01C 13/00 356/3.13 |
| 5,227,859 A * | 7/1993 | Leib | ............... | G01S 3/782 356/457 |
| 5,280,167 A * | 1/1994 | Dubois | ............... | G01S 3/784 342/54 |
| 5,548,392 A * | 8/1996 | Ogawa | ............... | G01S 5/06 356/3.13 |
| 5,771,092 A * | 6/1998 | Dubois | ............... | G01S 3/781 356/138 |
| 6,405,975 B1 * | 6/2002 | Sankrithi | ............... | B64D 47/08 244/50 |
| 6,665,063 B2 * | 12/2003 | Jamieson | ............... | G01S 17/58 356/4.01 |
| 7,683,310 B1 * | 3/2010 | Sinclair | ............... | G01S 7/4804 250/203.1 |
| 8,587,770 B1 * | 11/2013 | Johnston | ............... | G01S 13/9303 356/3.01 |
| 9,571,802 B2 * | 2/2017 | Scherbarth | ............... | G01S 3/784 |
| 9,626,588 B1 * | 4/2017 | Antaki | ............... | G06K 9/52 |
| 2003/0234349 A1 * | 12/2003 | Wootton | ............... | G01S 3/783 250/226 |
| 2004/0104334 A1 * | 6/2004 | Gal | ............... | G02B 13/06 250/203.6 |
| 2005/0177307 A1 * | 8/2005 | Greenfeld | ............... | G01S 3/7864 701/409 |
| 2007/0034776 A1 * | 2/2007 | Weber | ............... | G01S 17/42 356/138 |
| 2008/0002192 A1 * | 1/2008 | David | ............... | G01S 3/783 356/141.5 |
| 2013/0002525 A1 * | 1/2013 | Foote | ............... | G06F 3/012 356/614 |
| 2013/0070239 A1 * | 3/2013 | Crawford | ............... | G01S 17/66 356/139.04 |
| 2014/0049772 A1 * | 2/2014 | Zollars | ............... | G01S 3/784 356/138 |
| 2015/0035699 A1 * | 2/2015 | Yun | ............... | G01S 5/0036 342/357.29 |
| 2015/0195495 A1 * | 7/2015 | McEwan | ............... | G06K 9/0063 348/144 |
| 2015/0219426 A1 * | 8/2015 | Moraites | ............... | G06T 7/70 235/412 |

OTHER PUBLICATIONS

"NEVER aim laser pointers at aircraft!", Retrieved from the Internet: <http://laserpointersafety.com/laser-hazards_aircraft/laser-hazards_aircraft.html>, Accessed on Jul. 18, 2014, 2014, 6 pgs.

"US: FBI uses sophisticated surveillance to catch Portland man who lased ~25 aircraft", Retrieved from the Internet: <http://www.laserpointersafety.com/news/news/other-news_files/ed28e1fc484ed65db1c9aa7fd009e5cc-361.php>, Accessed on Jul. 18, 2014, 2014, 2 pgs.

Dubois, J. et al., "Detecting laser sources on the battlefield", Proc. SPIE 6796, Photonics North 2007, 67962F, Oct. 26, 2007, 16 pgs.

\* cited by examiner

LOCATING LIGHT SOURCES USING AIRCRAFT

BACKGROUND

Widespread availability of low-power light sources (e.g., laser pointers) and other sources of concentrated light led to many recent attacks on aircraft, particularly near airports and high air traffic areas. These attacks may cause harm to pilots and, in some cases to, aircraft. For example, a high intensity light directed at a pilot cabin may blind pilots and effectively disable them during critical portions of the flight, such as during takeoff and/or landing. Most attacks happen when aircraft are at low altitudes. Light sources are typically positioned on the ground. While existing legal mechanisms are designed to heavily penalize laser attackers and other similar attackers, these mechanisms have not been effective in discouraging these individuals, and unfortunately the frequency and severity of attacks continue to rise. One problem is difficulty in locating attackers on the ground. Attacks can be performed from large areas surrounding airports. Often, these areas are heavily populated. Furthermore, attackers can move within these areas after completing their attacks and even during their attacks. It has been found that laser and other like attacks can be more effectively detected from elevations (e.g., an airborne aircraft), preferably within a light projection zone (e.g., by an aircraft being under attack). Law enforcement helicopters deployed within an airport zone have been successfully used to locate attackers in the past. However, using these law enforcement helicopters and other such aircraft is expensive and can be dangerous in heavy air traffic areas, such as airports, where most of the attacks happen. Furthermore, law enforcement aircraft are unlikely to be in light projection zones and being attacked. Furthermore, attackers may temporarily suspend their attacks if law enforcement aircraft, which are often easily identifiable, are present in the area.

SUMMARY

Provided are methods and systems for identifying location of light sources from airborne aircraft. Light sources are ground based and may be low power lasers and other like devices. An aircraft equipped with a detecting module, such as a camera of a ground maneuver camera system, may defect light source output and associate this output with the relative position of the aircraft to the light source. This information may be analyzed together with aircraft location information (at the time of light source detection) to generate a light source location estimate. In some embodiments, other information, such as transmission from other aircraft and/or ground based nodes can be used. The estimate may be transmitted to a ground based node, such as a law enforcement unit. The data from multiple aircraft and/or ground based nodes may be aggregated to more precisely identify the light source location.

In some embodiments, a method for identifying location of a light source involves detecting an output from the light source. The light source is positioned on a ground and may be referred to as a ground based light source. The output is detected using a detecting module positioned on an aircraft. Alternatively, the light source output may be detected by a user (e.g., a human operator, pilot, and the like) in addition to or instead of the detecting module. For example, some aircraft may not be equipped with detecting modules. In some embodiments, the detecting module is a part of a ground maneuver camera system (GMCS) of the aircraft. The detection is performed while the aircraft is airborne. Detecting the output from the light source generates a first data set comprising a relative position of the light source to the aircraft. The first data set may be generated by the detecting module and/or by a user (e.g., a pilot). The method may also involve obtaining a second data set from a positioning module of the aircraft, in response to detecting the output from the light source. The second data set comprising the aircraft location at the time of detecting the output from the light source. The method may proceed with collectively analyzing the first data set and the second data set and generating an estimate of the location of the light source as a part of this analysis. The analysis may be performed at the aircraft or the data sets may be transmitted to some other location for analyzing. The method may also involve transmitting the estimate to a ground based node. The ground based node may be a law enforcement unit and will use this estimate to survey the estimated location.

In some embodiments, the method also involves repeating detecting the output from the light source, obtaining the second data set from the aircraft positioning unit, and collectively analyzing the first data set and the second data set at least once. The detected output may be from the same light source or a different light source. Furthermore, these operations may be performed by the same aircraft or a different aircraft. In some embodiments, these operations (i.e., detecting the output from the light source, obtaining the second data set from the aircraft positioning unit, and collectively analyzing the first data set and the second data set) are repeated at least once prior to transmitting the estimate to the ground based node.

In some embodiments, detecting the output from the light source comprises capturing an image and analyzing the image for light intensity. Other image characteristics may be used for this analysis in addition to or instead of light intensity.

In some embodiments, the first data set comprises a latitude angle and a longitude angle. The first data set may be generated based on orientation of the detecting module on the aircraft at the time of detecting the output from the light source. In some embodiments, the detecting module may be capable of changing its orientation. The orientation may be changed when the output from the light source is detected, for example, to direct the detecting module onto the light source and/or adjust the orientation of the detecting module due to movement of the aircraft relative to the light source. In some embodiments, the second data set further comprises one or more of the velocity of the aircraft, flying acceleration of the aircraft, and flying direction of the aircraft.

In some embodiments, the estimate comprises a longitude value and a latitude value. Furthermore, the estimate may comprise a probability value. The probability value indicates the probability of the light source being presented in the light source location provided in the estimate. The probability value may be calculated based on various factors, such as detected light intensity, weather conditions (e.g., visibility), map location, and the like.

In some embodiments, the estimate is transmitted using a transmission module through one an Automatic Dependent Surveillance-Broadcast (ADS-B) link or a point-to-point Aircraft Communications Addressing and Reporting System (ACARS) link. These links may be directly accessible to law enforcement agencies to expedite the response time. Some examples, the ground based node is one of an air traffic control (ATC) unit, an airline operations center (AOC), or a ground based law enforcement unit.

In some embodiments, the light source is a laser having a power of less than 5 mW. A specific example includes laser pointers. Other light sources capable of producing concentrated light beams are also within the scope.

In some embodiments, the light output detected by the light detecting sensor is not directed at the aircraft. More specifically, the light beam may not come in contact with the detecting module. For example, the light output may be visible due to the dust or moisture (e.g., fog) in the air.

In some embodiments, the method also involves transmitting the first data set and the second data set to a different aircraft. The analysis of these data sets may be performed at this other aircraft in addition to or instead of analyzing the data set on the aircraft that has generated these data sets.

In some embodiments, the method also involves transmitting the first data set and the second data set to the ground based node. The data sets may be transmitted in addition or instead of transmitting the location estimate. In some embodiments, the aircraft is not involves in collectively analyzing the first data set and the second data set. These operations may be performed at the ground based node. The estimate generated at this ground based node may be then transmitted to another ground based node. For example, the analysis may be performed at an airline operations center (i.e., a first ground based node) and then transmitted to a law enforcement unit (i.e., a second ground based node).

In some embodiments, the method also involves receiving a third data set and a fourth data set. The third data set comprising an additional relative position of the light source to an additional aircraft, while the fourth data set comprising an additional aircraft location at a time of detecting an additional output from the light source by the additional aircraft. For example, the same light source may be detected by different aircraft and the data sets generated by these different aircrafts may be transmitted to one of these aircrafts for performing an analysis. In some embodiments, collectively analyzing the first data set and the second data set further comprises analyzing the third data set and the fourth data set.

In some embodiments, a system for identifying location of a light source comprises a detecting module for detecting an output from the light source. The light source is positioned on a ground. Detecting the output from the light source generates a first data set comprising a relative position of the light source to an aircraft comprising the system. The system also comprises a positioning module for generating a second data set comprising an aircraft location at a time of detecting the output from the light source. The system also comprises an analyzing module for collectively analyzing the first data set and the second data set and generating an estimate of the location of the light source. The system also comprises a communication module for transmitting the estimate to a ground based node.

In some embodiments, a computer program product comprises a computer usable medium having a computer readable program code embodied therein. The computer readable program code is adapted to be executed to implement a method for identifying location of a light source. The method comprises detecting an output from the light source. The light source is positioned on a ground. The output is detected using a detecting module positioned on an aircraft while the aircraft is airborne and/or by a user present on the aircraft. The method also involves detecting the output from the light source generates a first data set comprising a relative position of the light source to the aircraft. The method involves obtaining a second data set from a positioning module of the aircraft in response to detecting the output from the light source. The second data set comprises the aircraft location at the time of detecting the output from the light source. The method also involves collectively analyzing the first data set and the second data set. Collectively analyzing the first data set and the second data set generates an estimate of the location of the light source. The method also involves transmitting the estimate to a ground based node.

These and other embodiments are described further below with reference to the figures.

BRIEF DESCRIPTION OF THE DRAWINGS

Having thus described examples of the disclosure in general terms, reference will now be made to the accompanying drawings, which are not necessarily drawn to scale, and wherein like reference characters designate the same or similar parts throughout the several views, and wherein:

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific examples, it will be understood that these examples are not intended to be limiting.

Reference herein to "one example" or "one aspect" means that one or more feature, structure, or characteristic described in connection with the example or aspect is included in at least one implementation. The phrase "one example" or "one aspect" in various places in the specification may or may not be referring to the same example or aspect.

Introduction

Methods and systems described herein are used for identifying location of light sources, such as laser pointers and other low power lasers. These methods and systems utilize airborne aircraft that may or may not be target, e.g., light beams of these light sources directed at these aircraft or some other aircraft. Aircraft-based detection allows more precisely estimating locations of the light sources in comparison, for example, to ground based detection techniques. An aircraft may be equipped with a detecting module, which may be a camera or any other suitable device. Alternatively, a user (e.g., a pilot) present on the airborne aircraft may detect the light source output in addition to instead of the detecting module. In some embodiments, some of the existing devices may be configured for identifying location of light sources, e.g., operable as detecting modules. For example, the detecting module may be a part of a ground maneuver camera system of the aircraft. As such, aircraft used for the method and equipped with the systems described herein do not need to be specialized aircraft, such as law enforcement aircraft. Furthermore, multiple aircrafts may be utilized to identifying location of the same light source making this identification process more precise.

When the aircraft is airborne, the detecting module and/or a user on the aircraft has a better field of view of the ground, where light sources are typically positioned, than, for example, a similarly equipped ground based node (or the same aircraft that is not airborne). The output of the detecting module and/or user may include relative position of the aircraft to the light source at the time of detection. This information may be analyzed to estimate the location of the light source on the ground. For example, the location of the aircraft at the time of detection may be considered. Other factors may be considered as well. The analysis may be carried out by a processing module of the system that may be positioned on the aircraft. Alternatively, the analysis may be carried out by another node (e.g., another aircraft or ground based node) that receives the relative position information from the aircraft that has detected the light source output.

The aircraft or node that generated an estimate then transmits this estimate to a ground based node, which may be an air traffic control unit, airline operations center, or a ground based law enforcement unit. The estimate may be then used by ground based personnel to search for the light source. In some embodiments, multiple estimates may be aggregated to provide a more precise total estimate.

Although this disclosure primarily focuses on light sources and outputs produced by laser sources, which are often referred to as laser outputs, other bright directional light devices, such as searchlights and spotlights, and their outputs are also within these scope. In general, any light source that has an output capable of interfering with airborne aircraft and causing dazzling, distracting, and blinding effects in these aircraft is within the scope of this disclosure.

The existing solutions, such as ground based detection or deployment of special purpose aircraft, are generally not capable of effectively detecting most attackers on aircraft with light sources. Most attacks are carried only for a short period of time from the same location. The ground based detection systems are not precise in estimating light source locations on the ground because of relative positions of these systems and light sources (i.e., both being positioned on the ground). The special purpose aircraft are costly to operate and may interfere with air traffic. As noted above, attacks using light sources are often performed in areas with heavy air traffic and deploying additional aircraft in these areas may be dangerous. Furthermore, a special purpose aircraft may not be able to cover all areas of possible attacks, which may be any area with low altitude air traffic. Finally, a special purpose aircraft may be overt to attackers, who may choose to postpone the attack while the special purpose aircraft is present in the area.

Overall, positioning a detecting module and/or relying on a user present on an aircraft, which may be susceptible to an attack, as described herein, is more effective in identifying location of a light source used for the attack than existing methods. When the aircraft is airborne and in the attack zone, the detecting module and/or the user has a more direct line of sight of the light source and can more precisely identify the relative position of the light source to the aircraft. This information may be combined with the information about location of the aircraft at the time of attack.

Multiple aircraft travelling thought the same area may be equipped with detecting modules or have users capable of detecting light source output. In fact, various existing hardware components may be adapted to perform various operations performed herein. Each aircraft equipped with a detecting module may have a flight path that is not specifically set for detecting attack. The aircraft may have a primary purpose, such as transporting passengers and/or cargo. Identifying location of light sources on the ground may be a secondary function. As a result, there are no additional costs involved in operating these aircraft. Another important factor is that adding such capabilities to regular aircraft does create addition air traffic.

Methods and systems described herein are cost-effective and may utilize existing aircraft components, such as onboard cameras, global positioning system (GPS), and communication systems. Specific examples of communication systems include, but are not limited to, open Automatic Dependent Surveillance-Broadcast (ADS-B) link and point-to-point Aircraft Communications Addressing and Reporting System (ACARS) link, which may be a part of an Airline Operations Center (AOC) link.

In some embodiments, a system for identifying location of a light source may include one or more airborne nodes and one or more ground based nodes. These different nodes can collaborate together to estimate the light source location. While in general, the ground based nodes are less precise than airborne nodes in estimating light source locations, the ground based nodes can be used to aggregate information, process information, communicate with various other nodes, or investigate the estimated location. In some embodiments, a ground based node is also used in estimating the location of the light source in addition to an airborne node. A ground based node may be stationary (e.g., positioned at a particular location near or at an airport) and/or movable (e.g., is a part of a law enforcement vehicle).

The methods and systems described herein are capable of identifying locations of light sources in more types of attacks than conventional systems. Specifically, these methods and systems are capable of identifying locations of low power lasers (e.g., laser pointers), light sources used for random attacks, movable light sources, and various combinations and variations thereof. These methods and systems also decrease time, cost, and effort needed for law enforcement to locate attacker (e.g., reduction in aerial vehicle usage and ground surveillance of suspect) in comparison to the conventional systems.

System Examples

Figure 1:
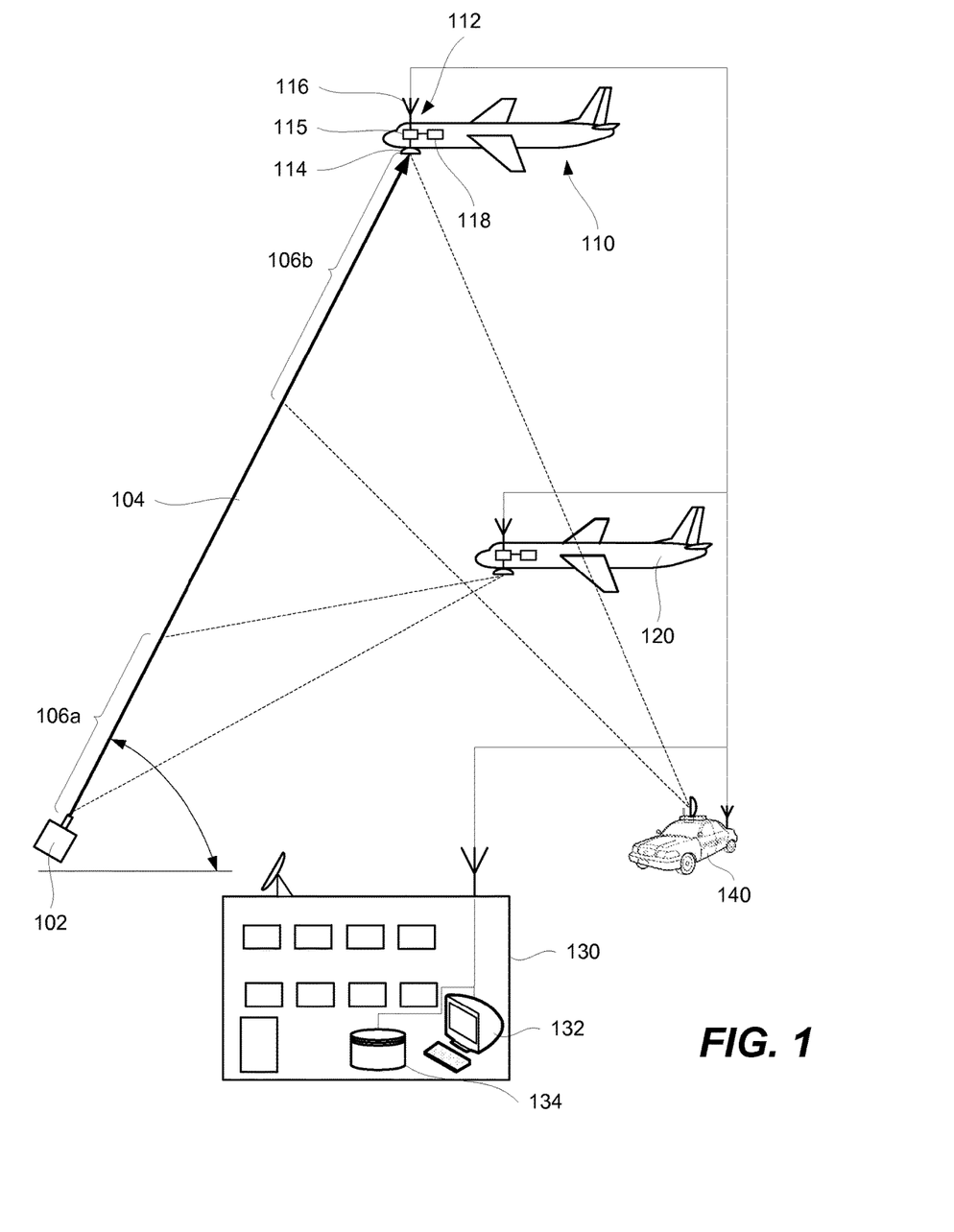
FIG. 1 is a schematic representation of various interactions between aircraft, ground based nodes, and light source, in accordance with some embodiments.

FIG. 1 is a schematic illustration of various nodes and interactions between these nodes used for identifying location of light source 102, in accordance with some embodiments. While four nodes are shown, i.e., aircraft (or airborne nodes) 110 and 120 and ground based nodes 130 and 140, one having ordinary skills in the art would understand that any number of nodes may be used for this purpose. In general, at least one aircraft, e.g., aircraft 110, and at least one ground based node, e.g., ground based node 130 may be used for identifying location of light source 102. In some embodiments, multiple aircraft, e.g., aircraft 110 and 120 in FIG. 1, may be present within the operating zone of light source 102 at the same time. As such, aircraft 110 and 120 may detect output 104 from light source 102 at the same time. In other instances, each aircraft may pass through the operating zone and detect output 104 from light source 102 at different times. In some embodiments, output 104 from light source 102 may be also detected by ground based node 140 as shown in FIG. 1. When multiple nodes detect any light source output within the same general area, the information about these detections may be aggregated to determine if these detected outputs are from the same or different light sources.

Figure 2:
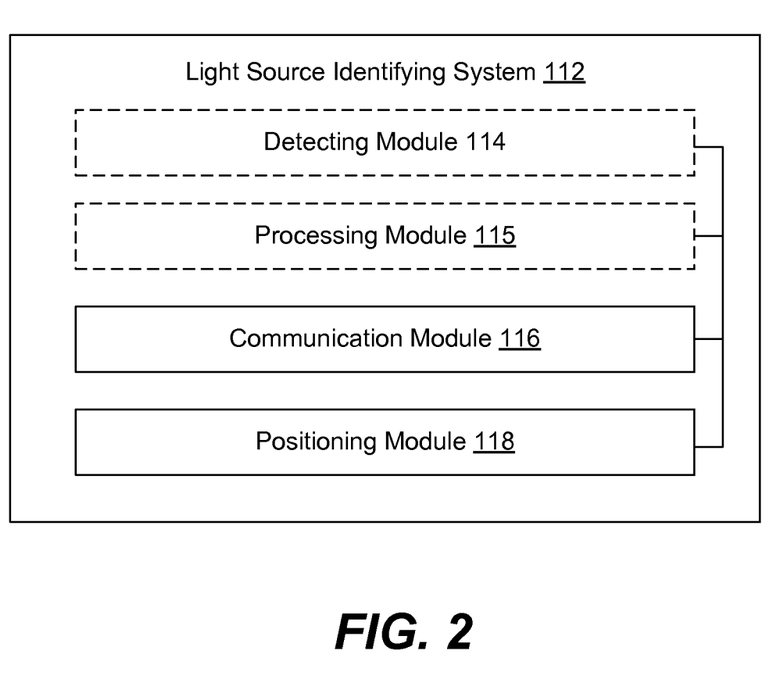
FIG. 2 is a schematic representation of a system for identifying location of a light source, in accordance with some embodiments.

Aircraft 110 may be a passenger airplane, cargo airplane, helicopter, or any like aerial vehicle. Aircraft 110 include light source identifying system 112 for identifying location of light source 102. In some embodiments, aircraft 110 includes some (but not all) components of light source identifying system 112. Other components may be positioned on other nodes. Similar light source identifying systems may be positioned on other aircraft and/or ground based nodes. Light source identifying system 112 may include detecting module 114, processing module 115, communication module 116, and positioning module 118 as shown in FIG. 2. Some of these components may be components (e.g., specifically configured or adapted components) of other systems, such as avionics of aircraft 110. Each of these components will now be described in more detail. In some embodiments, functions of detecting module 114 may be performed by a user. For example, a pilot may detect the light source output and determine relative position of the light source to the aircraft. As such, detecting module 114 may be absent from light source identifying system 112.

Detecting module 114 is used for detecting output 104 from light source 102. Output 104 (e.g., a light beam) does not necessarily need to reach detecting module 114. Output 104 directed at another aircraft may be still detected by detecting module 114. For example, the light beam may be visible from a distance due to scattering from dust particles or water droplets along the beam path. Higher-power and higher-frequency green or blue lasers may produce a beam visible even in clean air because of Rayleigh scattering from air molecules, especially when viewed in dimly lit conditions (e.g., evening or night). Detecting module 114 may be a camera or any other device capable of detecting a high intensity light output. For example, a camera attached to the bottom portion of aircraft's airframe may be used as detecting module 114. Detecting module 114 may be part of another aircraft system and may include the ability to receive input from pilots as to a location of a light source. For example, a camera that is a part of a ground maneuver camera system (GMCS) of aircraft 112a may be used or adapted for use as detecting module 114. Conventional uses of a GMCS including providing pilots with real-time views of the landing gear (e.g., deployment status), ground conditions, and proximity to the pavement edge during taxi maneuvers. One or more cameras of the GMCS may be mounted behind the nose gear and/or in leading edges of the horizontal stabilizer. The GMCS camera used as detecting module 114 does not need to display images captured by the camera to the pilots. Instead, these images may be processed by the camera or sent to processing module 115 for detecting output 104 of light source 102. For example, one or more images captured by the camera may be analyzed for light intensity. If the light intensity exceeds a certain threshold (e.g., in a portion of the image), then this portion is deemed to represent output 104 of light source 102. The location of this portion on the image may be used to determine relative position of light source 102 to aircraft 110. This relative position or the entire image may be included into a first data set sent to processing module 115 and/or, in some embodiments, transmitted to a ground based node.

The orientation of detecting module 114 relative to aircraft 110 may be fixed. Alternatively, detecting module 114 may be movable (e.g., pivotable) with respect to aircraft 110. For example, detecting module 114 may rotate in order to scan a larger area. In some embodiments, output 104 from light source 102 is detected at two or more different orientations of detecting module 114. These different orientations may be used to more precisely determine relative position of light source 102 to aircraft 110. Furthermore, the initial detection of output 104 from light source 102 may be used to change the orientation of detecting module 114.

Detecting module 114 may be communicatively coupled to processing module 115 and configured to provide the first data set to processing module 115. As noted above, the first data set includes relative position of light source 102 to aircraft 110. Alternatively, detecting module 114 may be communicatively coupled to communication module 116 and configured to provide the first data set to communication module 116. Communication module 116 may then transmit this data set to another node.

Positioning module 118 is used to estimate aircraft location or, more specifically, to estimate aircraft location at the time of detecting output 104 from light source 102. Positioning module 118 may be a GPS sensor, inertial navigation system (INS) sensor, or any other like sensor. Positioning module 118 may be communicatively coupled to processing module 115 and configured to provide the second data set to processing module 115. The second data set includes the aircraft location at the time of detecting output 104 from light source 102. Alternatively, positioning module 118 may be communicatively coupled to communication module 116 and configured to provide the first data set to communication module 116. Communication module 116 may then transmit this second data set to another node.

Processing module 115 is an optional module of light source identifying system 112 as shown in FIG. 2. Processing module 115 may be used to collectively analyze the first data set and the second data set and to generate an estimate of the location of the light source. If present, processing module 115 may be communicatively coupled to positioning module 118, detecting module 114, and communication module 116. Alternatively, processing of the first data set and the second data set may be performed by another node. In this case, the first data set and the second data set are transmitted to this other node.

Processing module 115 and/or, in some embodiments, positioning module 118 and detecting module 114 may be communicatively coupled to communicating module 116. Communicating module 116 may be an Aircraft Communications Addressing and Reporting System (ACARS), such as an air-band radio ACARS or a satellite ACARS. Communicating module 116 may be configured to transmit light source location estimate and/or various data sets to other nodes, such as other airborne nodes and/or ground based nodes, as for example, shown in FIG. 1. These other nodes may be also equipped with similar communicating modules. In some embodiments, communicating module 116 is configured to transmit to another aircraft 120, air traffic control unit, AOC, and/or ground based law enforcement unit. FIG. 1 schematically illustrates two ground based nodes 130 and 140. However, one having ordinary skills in the art would understand that any number of ground based nodes and any number of airborne nodes can receive transmission from aircraft 110.

It should be noted that in addition to aircraft 110, other nodes may also be capable of detecting output 104 from light source 102. Some of these nodes may also have light source identifying systems similar to ones described above with reference to FIG. 2. When multiple nodes detect output 104 from light source 102 either at the same time or within a set time span (e.g., 1 minute, 5 minute, or 1 hour), a node may be designated to gather information from all detecting nodes and aggregate this information to provide a more precise estimate of the light source location or provide indication that light source 102 is mobile. FIG. 1 illustrates an example of detecting output 104 from light source 102 by three different nodes, i.e., aircraft 110, aircraft 120, and ground based node 140. Aircraft 110 may be referred to as a target aircraft since output 104 (e.g., a laser beam) is directed at this aircraft. Because of the direct line of sight, detecting module 114 of aircraft 110 may be capable of detecting the entire path of output 104 starting at light source 102. Furthermore, intensity of output 104 detected by detecting module 114 may be the greatest (in comparison to intensities detected by aircraft 120 and ground based node 140). The path information and the intensity may be provided in the first data as additional indicators of the relative position of light source 102 to aircraft 110.

FIG. 1 schematically illustrates that aircraft 120 and ground based node 140 detect output 104 from light source 102 that is directed at aircraft 110. Because of the limited lines of sights, this detection may involve only portions of output 104. Specifically, aircraft 120 is shown to detect portion 106a, while ground based node 140 is shown to detect portion 106b. These portions may be different and, in some embodiments, may not overlap. Furthermore, these portions may include one or both ends of the entire path of output 104. Identifying these ends may be particularly helpful to more precisely estimate the light source location. Aircraft 120 and ground based node 140 may generate data sets including relative orientations of aircraft 120 and ground based node 140 to light source 102. Furthermore, aircraft 120 and ground based node 140 may provide data sets including locations of aircraft 120 and ground based node 140 at the time of detection. In some embodiments, a ground based node that has detected output 104 is stationary and its location is known to other nodes, in which case a data set including location of this node may not be provided. The data sets may be processed at respective nodes to generate estimates of the light source location.

In some embodiments, one or more nodes, such as ground based ADS-B receivers, can also passively intercept aircraft ADS-B transmissions from other nodes such as aircraft 110, aircraft 120, and/or ground based node 140. An aircraft may be a part of an airliner, in which case, the aircraft may utilize a point-to-point communications link, such as ACARS, to communicate with the corresponding AOC. The AOC may perform off-board processing tasks and information exchange. The AOC or, some other node, may also aggregate information, such as data sets and/or location estimates from other nodes and then collectively process this information. For example, FIG. 1 illustrates ground based node 130 equipped with processing module 132 and database 134. Ground based node 130 may be an AOC.

In some embodiments, some nodes (e.g., law enforcement vehicles) may include ADS-B receivers to receive data sets and/or estimates from aircraft and other nodes. Using this information combined with visual observation and other aids, the ground based law enforcement may narrow a search area and converge more rapidly on an attacker.

Processing Examples

Figure 3:
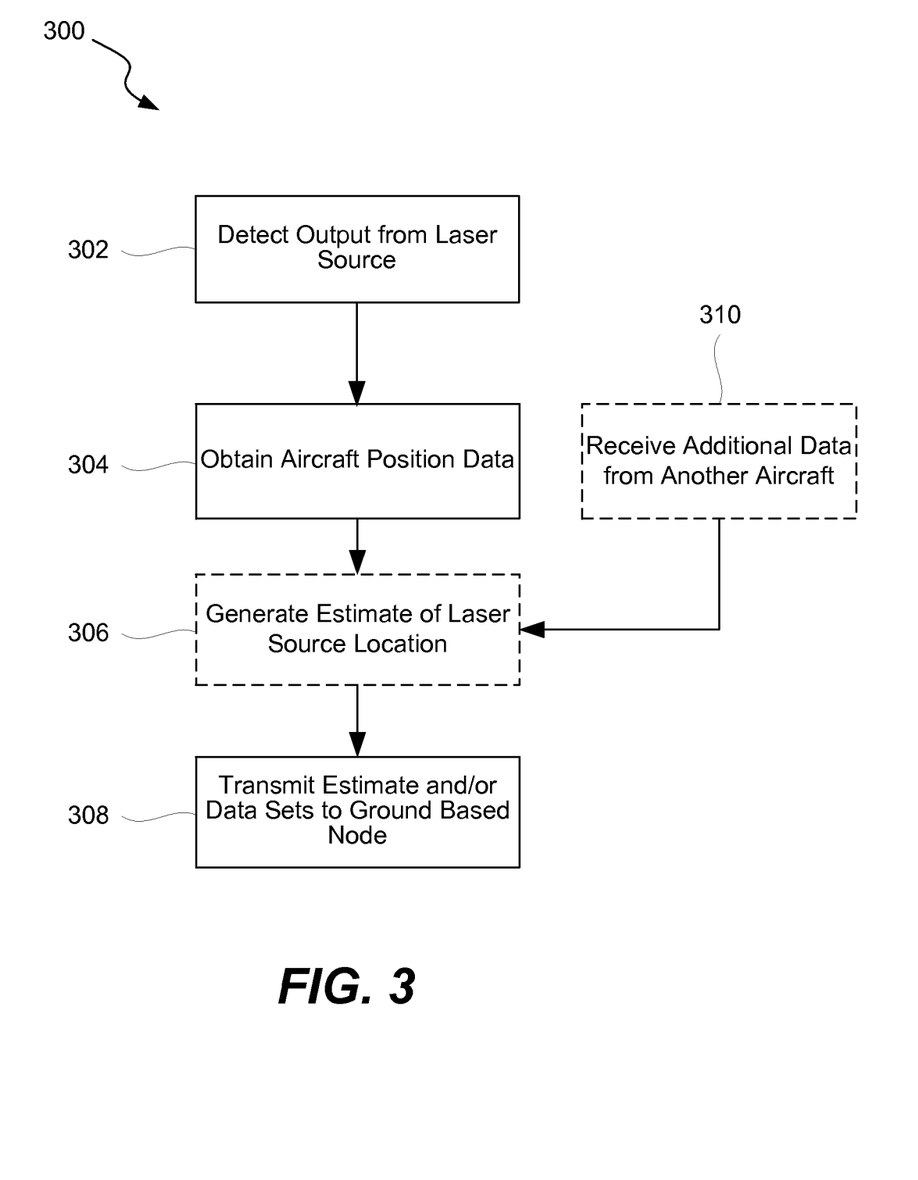
FIG. 3 is a process flowchart corresponding to a method for identifying location of a light source, in accordance with some embodiments.

FIG. 3 is a process flowchart corresponding to method 300 for identifying location of a light source, in accordance with some embodiments. Method 300 may commence with detecting an output from the light source during operation 302. The light source is positioned on a ground. Various examples of light sources are described above with reference to FIG. 1. The laser output may be generated maliciously, e.g., to attack an aircraft, or may be unintentionally directed to the aircraft and interfere with operation of the aircraft. The output may be detected using a detecting module positioned on the aircraft while the aircraft is airborne. Various examples of detecting modules are described above with reference to FIG. 1.

The light output may be directed to the aircraft and reach the detecting module. Alternatively, the laser output may be detected even though the light output is not directed at the aircraft as described above. Detecting the laser output may involve capturing one or more images of aircraft surroundings and analyzing these images for unusual light patterns, such as elements with high light intensity, changing elements, and other elements. Various light intensity thresholds can be used during operation 302.

Detecting the output from the light source during operation 302 generates a first data set. The first data set includes relative position of the light source to the aircraft during detection of the light source output. For example, longitude and latitude angles may be included in the first set.

In some embodiments, prior to performing operation 302, the detecting module may be reoriented. For example, an aircraft may receive information from another node containing the estimated location of the light source. The aircraft may then direct its detecting module at this location. When the detecting module is movable, the first data set may include data about the orientation of the laser detecting sensor at the time of detecting the output from the light source. Furthermore, detection of the laser output may happen when the orientation of the laser detecting sensor changes.

Method 300 may proceed with obtaining a second data set from aircraft's positioning module during operation 304. The second data set is obtained in response to detecting the output from the light source in the previous operation. For example, a time of the detection may be transmitted to the positioning module and the coordinates of the aircraft at this time may be retrieved and presented as the second data set. Specifically, the second data set includes aircraft location at the time of detecting the output from the light source. In some embodiments, the second data set includes one or more of a flying velocity of the aircraft, a flying acceleration of the aircraft, and a flying direction of the aircraft.

Method 300 may proceed with collectively analyzing the first data set and the second data set and generating an estimate of the location of the light source based on this analysis during optional operation 306. In some embodiments, operation 306 is not performed. Instead, the first and second data sets may be transmitted to a ground based node. During operation 306 the relative position of the light source provided in the first data set may be analyzed in light of the actual position of the aircraft provided in the second set in order to estimate the actual location of the light source.

Method 300 may proceed with transmitting the estimate to a ground based node during operation 308. Various transmission links and techniques described above may be used in this operation. Examples include an ADS-B) link, ACARS link, and other like links.

In some embodiments, operations 302-308 may be repeated one or more times. For example, detecting another output during operation 302 may trigger other operations in this cycle. In some embodiments, multiple first data sets and multiple second data sets are accumulated before performing operation 306. For example, data sets may be pooled for a period of time before generating a location estimate and transmitting this estimate to the ground base node. Likewise, multiple location estimates generated during operation 306 may be combined into a single estimate (e.g., using statistical analysis) to generate a single estimate that is then transmitted to a ground based node during operation 306.

In some embodiments, method 300 may involve receiving an additional data set, e.g., a third data set, from another node, such another aircraft, during optional operation 310. Specifically, this other aircraft may detect an additional output from the light source. In response to this detection, this other aircraft may transmit relative position of the light source to this other aircraft (i.e., additional relative position data) and, in some embodiments, the position of this other aircraft at the time of detection (i.e., additional aircraft position data). As such, this additional set may include the time of detection, additional relative position data, and additional aircraft position data.

If this additional data set is received during operation 310, then this data may be used during operation 306 to generate or refine the estimate of the light source location. Specifically, this additional data set may be analyzed together with the first data set and the second date set to estimate the light source location.

In some embodiments, the time of detecting the additional output from the light source by the additional aircraft is same as the time of detecting the output from the light source by the aircraft. In other words, in these embodiments, the two aircraft detected the same output of the light source. However, the aircraft had different relative positions to the light source and, as a result, may provide different type of data sets. In facts, if data sets provided from each aircraft are analyzed individually, they may produce different estimates of the light source location. Combining these estimates (or performing of a combined analysis may.

Figure 4:
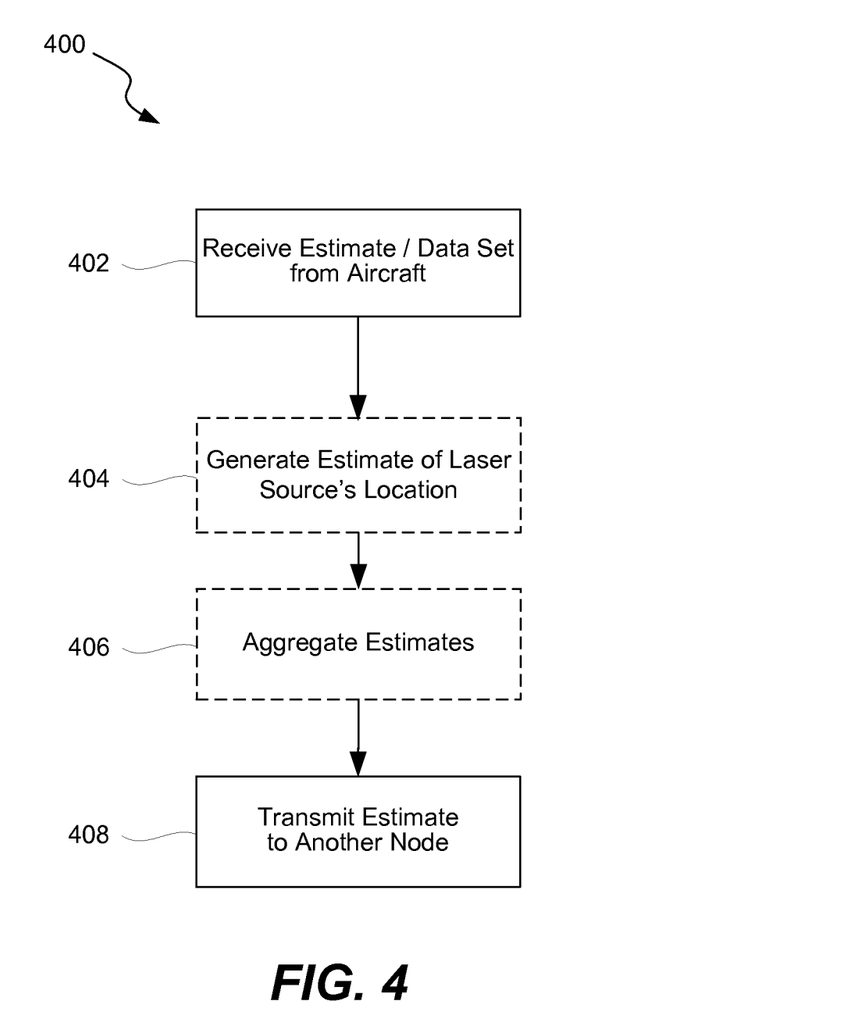
FIG. 4 is a process flowchart corresponding to a method for identifying location of a light source, in accordance with some embodiments.

FIG. 4 is a process flowchart corresponding to method 400 of identifying location of a light source, in accordance with some embodiments. Method 400 may be performed by another node when comparing to method 300 described above with reference to FIG. 3. For examples, method 300 may be performed by an aircraft or, more specifically, by a system for identifying light source locations provided on the aircraft. On the other hand, method 300 may be performed by a ground based link that receives information (e.g., data sets and/or location estimates) from the aircraft performing method 300.

Method 400 may commence with receiving the estimate of the light source location or, in some embodiments, data sets from another node during operation 402. This other node may be an aircraft that detected light source output and either collected data sets or even collectively analyzed these data sets to generate light source location estimate. Operation 402 may be similar to operation 308 described above with reference to FIG. 3.

If the node performing method 400 received data sets rather than light source location estimate, then method 400 may proceed with analyzing the data sets to generate the light source location estimate during optional operation 404. Operation 404 may be similar to operation 306 described above with reference to FIG. 3. In some embodiments, data sets from multiple different nodes are analyzed collectively during operation 404.

If multiple estimates are received or generated by the node, method 400 may proceed with aggregating these estimates during optional operation 406. This operation may involve averaging the available estimates (e.g., using weighted averages). Operation 406 may be also used to determine if the estimate represents the same light source and if the light source is mobile.

Method 400 may then proceed with transmitting an estimate (e.g., an aggregated) estimate to another node during operation 408. This other node may be a ground based law enforcement unit.

Examples of Aircrafts

Figure 5:
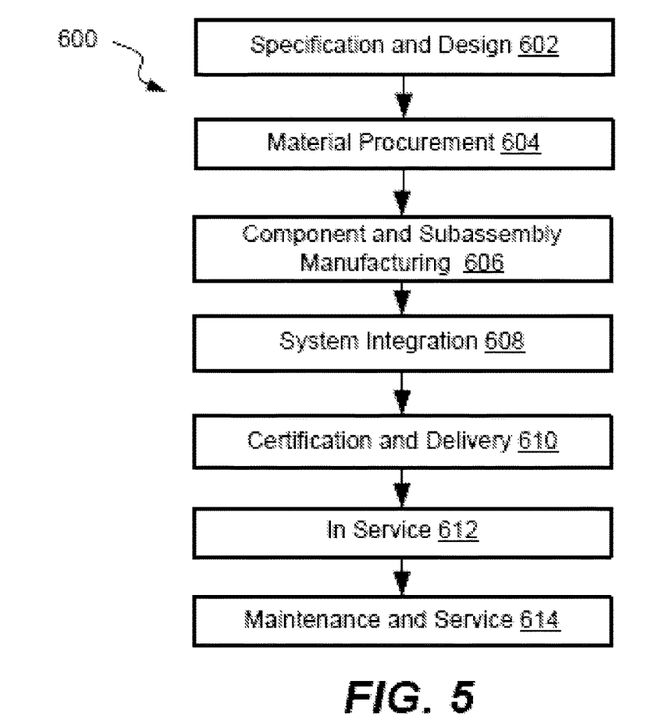
FIG. 5 is a process flowchart reflecting key operations in aircraft manufacturing and service, in accordance with some embodiments.

An aircraft manufacturing and service method 600 shown in FIG. 5 and an aircraft 630 shown in FIG. 6 will now be described to better illustrate various features of processes and systems presented herein. During pre-production, aircraft manufacturing and service method 600 may include specification and design 602 of aircraft 630 and material procurement 604. The production phase involves component and subassembly manufacturing 606 and system integration 608 of aircraft 630. Thereafter, aircraft 630 may go through certification and delivery 610 in order to be placed in service 612. While in service by a customer, aircraft 630 is scheduled for routine maintenance and service 614 (which may also include modification, reconfiguration, refurbishment, and so on). While the embodiments described herein relate generally to servicing of commercial aircraft, they may be practiced at other stages of the aircraft manufacturing and service method 600.

Each of the processes of aircraft manufacturing and service method 600 may be performed or carried out by a system integrator, a third party, and/or an operator (e.g., a customer). For the purposes of this description, a system integrator may include, without limitation, any number of aircraft manufacturers and major-system subcontractors; a third party may include, for example, without limitation, any number of venders, subcontractors, and suppliers; and an operator may be an airline, leasing company, military entity, service organization, and so on.

Figure 6:
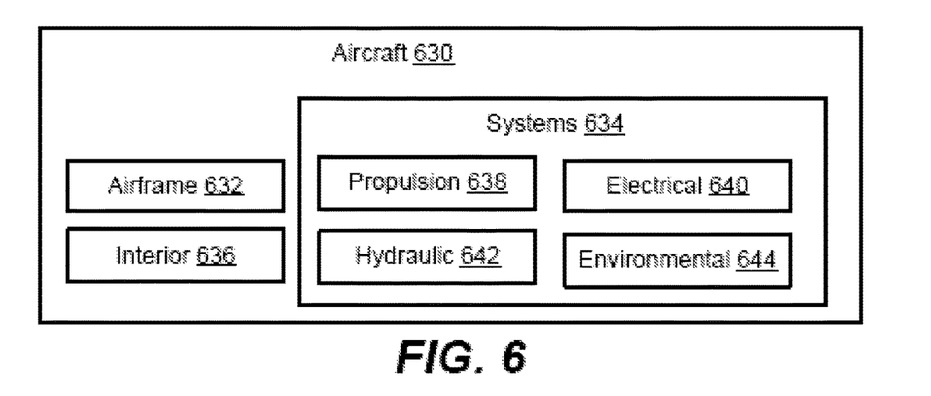
FIG. 6 is a block diagram illustrating various key components of an aircraft, in accordance with some embodiments.

As shown in FIG. 6, aircraft 630 produced by aircraft manufacturing and service method 600 may include airframe 632, interior 636, and multiple systems 634 and interior 636. Examples of systems 634 include one or more of propulsion system 638, electrical system 640, hydraulic system 642, and environmental system 644. Any number of other systems may be included in this example. Although an aircraft example is shown, the principles of the disclosure may be applied to other industries, such as the automotive industry.

Apparatus and methods embodied herein may be employed during any one or more of the stages of aircraft manufacturing and service method 600. For example, without limitation, components or subassemblies corresponding to component and subassembly manufacturing 606 may be fabricated or manufactured in a manner similar to components or subassemblies produced while aircraft 630 is in service.

Also, one or more apparatus embodiments, method embodiments, or a combination thereof may be utilized during component and subassembly manufacturing 606 and system integration 608, for example, without limitation, by substantially expediting assembly of or reducing the cost of aircraft 630. Similarly, one or more of apparatus embodiments, method embodiments, or a combination thereof may be utilized while aircraft 630 is in service, for example, without limitation, to maintenance and service 614 may be used during system integration 608 and/or maintenance and service 614 to determine whether parts may be connected and/or mated to each other.

Examples of Controller Computer Systems

Figure 7:
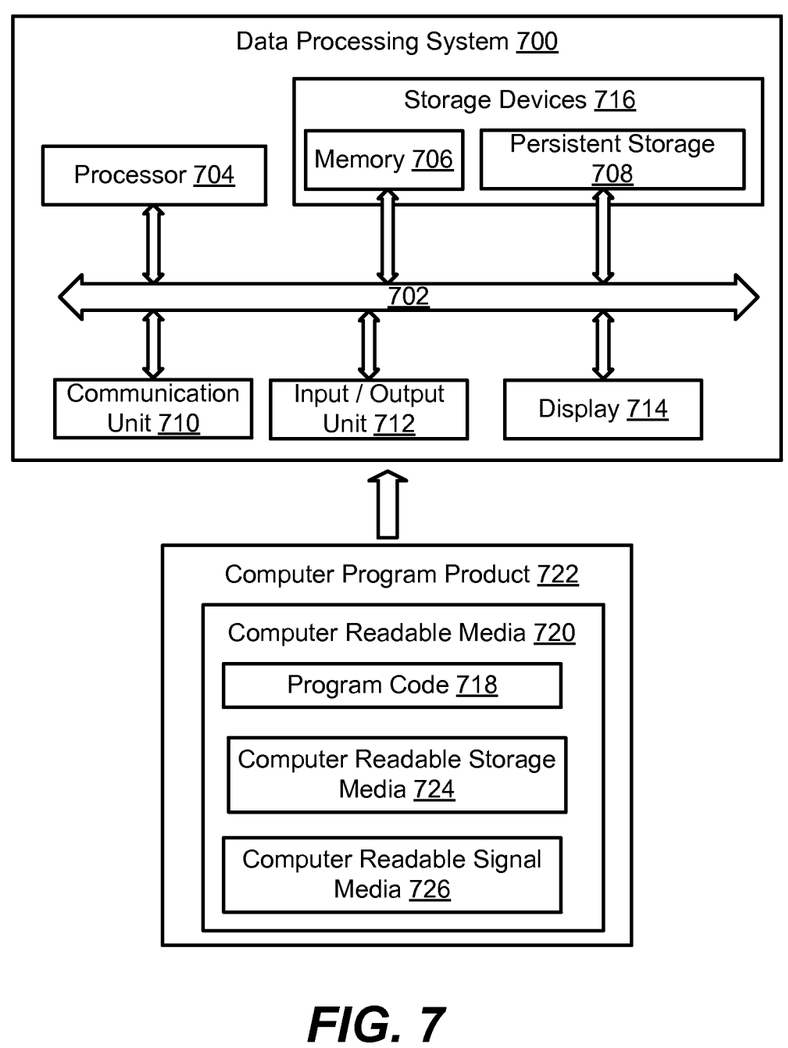
FIG. 7 is a block diagram illustrating a data processing system, in accordance with some embodiments.

Turning now to FIG. 7, an illustration of a data processing system 700 is depicted in accordance with some embodiments. Data processing system 700 may be used to implement one or more computers used in a controller or other components of various systems described above. In some embodiments, data processing system 700 includes communications framework 702, which provides communications between processor unit 704, memory 706, persistent storage 708, communications unit 710, input/output (I/O) unit 712, and display 714. In this example, communications framework 702 may take the form of a bus system.

Processor unit 704 serves to execute instructions for software that may be loaded into memory 706. Processor unit 704 may be a number of processors, a multi-processor core, or some other type of processor, depending on the particular implementation.

Memory 706 and persistent storage 708 are examples of storage devices 716. A storage device is any piece of hardware that is capable of storing information, such as, for example, without limitation, data, program code in functional form, and/or other suitable information either on a temporary basis and/or a permanent basis. Storage devices 716 may also be referred to as computer readable storage devices in these illustrative examples. Memory 706, in these examples, may be, for example, a random access memory or any other suitable volatile or non-volatile storage device. Persistent storage 708 may take various forms, depending on the particular implementation. For example, persistent storage 708 may contain one or more components or devices. For example, persistent storage 708 may be a hard drive, a flash memory, a rewritable optical disk, a rewritable magnetic tape, or some combination of the above. The media used by persistent storage 708 also may be removable. For example, a removable hard drive may be used for persistent storage 708.

Communications unit 710, in these illustrative examples, provides for communications with other data processing systems or devices. In these illustrative examples, communications unit 710 is a network interface card.

Input/output unit 712 allows for input and output of data with other devices that may be connected to data processing system 700. For example, input/output unit 712 may provide a connection for user input through a keyboard, a mouse, and/or some other suitable input device. Further, input/output unit 712 may send output to a printer. Display 714 provides a mechanism to display information to a user.

Instructions for the operating system, applications, and/or programs may be located in storage devices 716, which are in communication with processor unit 704 through communications framework 702. The processes of the different embodiments may be performed by processor unit 704 using computer-implemented instructions, which may be located in a memory, such as memory 706.

These instructions are referred to as program code, computer usable program code, or computer readable program code that may be read and executed by a processor in processor unit 704. The program code in the different embodiments may be embodied on different physical or computer readable storage media, such as memory 706 or persistent storage 708.

Program code 718 is located in a functional form on computer readable media 720 that is selectively removable and may be loaded onto or transferred to data processing system 700 for execution by processor unit 704. Program code 718 and computer readable media 720 form computer program product 722 in these illustrative examples. In one example, computer readable media 720 may be computer readable storage media 724 or computer readable signal media 726.

In these illustrative examples, computer readable storage media 724 is a physical or tangible storage device used to store program code 718 rather than a medium that propagates or transmits program code 718.

Alternatively, program code 718 may be transferred to data processing system 700 using computer readable signal media 726. Computer readable signal media 726 may be, for example, a propagated data signal containing program code 718. For example, computer readable signal media 726 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 700 are not meant to provide architectural limitations to the manner in which different embodiments may be implemented. The different illustrative embodiments may be implemented in a data processing system including components in addition to and/or in place of those illustrated for data processing system 700. Other components shown in FIG. 7 can be varied from the illustrative examples shown. The different embodiments may be implemented using any hardware device or system capable of running program code 718.

CONCLUSION

Different examples and aspects of the apparatus and methods are disclosed herein that include a variety of components, features, and functionality. It should be understood that the various examples and aspects of the apparatus and methods disclosed herein may include any of the components, features, and functionality of any of the other examples and aspects of the apparatus and methods disclosed herein in any combination, and all of such possibilities are intended to be within the spirit and scope of the present disclosure.

Many modifications and other examples of the disclosure set forth herein will come to mind to one skilled in the art to which the disclosure pertains having the benefit of the teachings presented in the foregoing descriptions and the associated drawings.

Therefore, it is to be understood that the disclosure is not to be limited to the specific examples presented and that modifications and other examples and aspects are intended to be included within the scope of the appended claims. Moreover, although the foregoing descriptions and the associated drawings describe example embodiments in the context of certain illustrative combinations of elements and/or functions, it should be appreciated that different combinations of elements and/or functions may be provided by alternative implementations without departing from the scope of the appended claims.

What is claimed is:

1. A method for identifying a location of a light source, the method comprising:
    detecting an output from the light source, wherein:
        the light source is positioned on a ground,
        the output is detected using a detecting module positioned on an aircraft while the aircraft is airborne, the aircraft is one of a passenger airplane or a cargo airplane, the aircraft is a target of the light source, the detecting module is movable relative to the aircraft, the detecting module is a camera attached to a bottom portion of an airframe of the aircraft, and detecting the output from the light source generates a first data set comprising a relative position of the light source to the aircraft and an orientation of the detecting module relative to the aircraft;

in response to detecting the output from the light source, obtaining a second data set from a positioning module of the aircraft, wherein the second data set comprising an aircraft location at a time of detecting the output from the light source;

collectively analyzing the first data set and the second data set at the aircraft, wherein collectively analyzing the first data set and the second data set generates an estimate of the location of the light source; and transmitting the estimate from the aircraft to a ground based node.

2. The method of claim 1, further comprising repeating detecting the output from the light source, obtaining the second data set from the positioning module, and collectively analyzing the first data set and the second data set at least once.

3. The method of claim 2, wherein detecting the output from the light source, obtaining the second data set from the positioning module, and collectively analyzing the first data set and the second data set are repeated at least once prior to transmitting the estimate to the ground based node.

4. The method of claim 1, wherein detecting the output from the light source comprises capturing an image and analyzing the image for light intensity.

5. The method of claim 4, wherein analyzing the image for light intensity comprises:

comparing the light intensity in each portion of the image to a threshold; and if the light intensity of a portion exceeds the threshold, then identifying the portion as representing the light source; and determining the relative position of the light source to the aircraft based on a location of the portion representing the light source on the image.

6. The method of claim 1, wherein the first data set comprises a latitude angle and a longitude angle.

7. The method of claim 1, wherein the first data set is generated based on orientation of the detecting module on the aircraft at the time of detecting the output from the light source.

8. The method of claim 1, wherein the second data set further comprises one or more of a velocity of the aircraft, a flying acceleration of the aircraft, and a flying direction of the aircraft.

9. The method of claim 1, wherein the estimate comprises a longitude value and a latitude value.

10. The method of claim 1, wherein the estimate comprises a probability value, the probability value indicating probability of the light source being present in the location of the light source provided in the estimate.

11. The method of claim 1, wherein the estimate is transmitted using a transmission module through one of an Automatic Dependent Surveillance-Broadcast (ADS-B) link or a point-to-point Aircraft Communications Addressing and Reporting System (ACARS) link.

12. The method of claim 1, wherein the ground based node is one of an air traffic control (ATC) unit, an airline operations center (AOC), or a ground based law enforcement unit.

13. The method of claim 1, wherein the output detected by the detecting module is not directed at the aircraft.

14. The method of claim 1, further comprising transmitting the first data set and the second data set to a different aircraft.

15. The method of claim 1, further comprising transmitting the first data set and the second data set to the ground based node.

16. The method of claim 1, further comprising receiving a third data set and a fourth data set, the third data set comprising an additional relative position of the light source to an additional aircraft, the fourth data set comprising an additional aircraft location at a time of detecting an additional output from the light source by the additional aircraft.

17. The method of claim 16, wherein collectively analyzing the first data set and the second data set further comprises analyzing the third data set and the fourth data set.

18. The method of claim 1, wherein the detecting module is a part of a ground maneuver camera system (GMCS) of the aircraft.

19. The method of claim 1, wherein detecting the output from the light source comprises detecting if the light source is directed at the aircraft using different intensity thresholds while analyzing an image captured by the detecting module.

20. A system for identifying a location of a light source, the system comprising:

a detecting module for detecting an output from the light source and for positioning on an aircraft, wherein:

the detecting module is a camera attached to a bottom portion of an airframe of the aircraft, the light source is positioned on a ground, detecting the output from the light source generates a first data set comprising a relative position of the light source to the aircraft comprising the system and an orientation of the detecting module relative to the aircraft, the aircraft is one of a passenger airplane or a cargo airplane, the aircraft is airborne and a target of the light source while detecting the output from the light source;

a positioning module for generating a second data set comprising an aircraft location at a time of detecting the output from the light source;

an analyzing module, positioned on the aircraft, for collectively analyzing the first data set and the second data set and generating an estimate of the location of the light source; and a communication module for transmitting the estimate from the analyzing module to a ground based node.

* * * * *